(12) United States Patent
Kim

(10) Patent No.: US 7,547,112 B2
(45) Date of Patent: Jun. 16, 2009

(54) LOW-CLEARANCE LIGHT EMITTING DIODE LIGHTING

(75) Inventor: Steven Kim, Palisades Park, NJ (US)

(73) Assignee: LED Folio Corporation, Palisades Park, NJ (US)

( * ) Notice: Subject to any disclaimer, the term of this patent is extended or adjusted under 35 U.S.C. 154(b) by 0 days.

(21) Appl. No.: 11/521,316

(22) Filed: Sep. 15, 2006

(65) Prior Publication Data

US 2007/0133193 A1 Jun. 14, 2007

Related U.S. Application Data

(60) Provisional application No. 60/749,091, filed on Dec. 12, 2005, provisional application No. 60/765,717, filed on Feb. 7, 2006, provisional application No. 60/774,200, filed on Feb. 17, 2006.

(51) Int. Cl.
*F21S 8/00* (2006.01)

(52) U.S. Cl. .................. 362/148; 362/612; 362/613; 362/364; 362/404

(58) Field of Classification Search .......... 362/145, 362/147–150, 404, 249, 576, 364–367, 612–613, 362/479, 490, 149, 84, 800, 27, 632–634, 362/555, 559–561, 97.1–97.4, 225, 249.01–249.19, 362/812; 52/28; 40/546–547
See application file for complete search history.

(56) References Cited

U.S. PATENT DOCUMENTS

| | | | |
|---|---|---|---|
| 6,655,814 B1 * | 12/2003 | Tagawa et al. | 362/183 |
| 6,704,071 B2 * | 3/2004 | Wang | 349/71 |
| 7,108,392 B2 * | 9/2006 | Strip et al. | 362/145 |
| 7,331,686 B2 * | 2/2008 | Ossevoort et al. | 362/145 |
| 2002/0021564 A1 * | 2/2002 | Cho et al. | 362/97 |
| 2002/0141181 A1 * | 10/2002 | Bailey | 362/150 |
| 2003/0043595 A1 * | 3/2003 | Luig et al. | 362/555 |
| 2003/0072145 A1 * | 4/2003 | Nolan et al. | 362/20 |
| 2004/0070967 A1 * | 4/2004 | Kennedy | 362/147 |
| 2004/0213003 A1 * | 10/2004 | Lauderdale et al. | 362/404 |
| 2004/0240230 A1 * | 12/2004 | Kitajima et al. | 362/558 |
| 2005/0088844 A1 * | 4/2005 | Wordin et al. | 362/217 |
| 2005/0219860 A1 * | 10/2005 | Schexnaider | 362/601 |
| 2005/0248935 A1 * | 11/2005 | Strip et al. | 362/145 |
| 2005/0257436 A1 * | 11/2005 | Vanderpol | 52/28 |
| 2007/0279897 A1 * | 12/2007 | Witherspoon | 362/147 |
| 2009/0016076 A1 * | 1/2009 | Overes et al. | 362/612 |

FOREIGN PATENT DOCUMENTS

WO WO 9741589 A1 * 11/1997

* cited by examiner

*Primary Examiner*—Anabel Ton
*Assistant Examiner*—Kevin Spinella
(74) *Attorney, Agent, or Firm*—Holland & Knight LLP

(57) ABSTRACT

A low-clearance lighting includes a plurality of light emitting diodes positioned on at least two side surfaces of a light tile or a plurality of external electrode fluorescent lights within an encasement of a light tile, a reflecting plate at a back surface of the light tile, and a metal frame for supporting the light tile and having exterior dimensions suitable for insertion into a ceiling-grid of a drop-ceiling.

19 Claims, 12 Drawing Sheets ly, to low-clearance lighting. Although the present invention is suitable for a wide scope of applications, it is particularly suitable for providing low-clearance lighting for either drop-ceilings, drywall/plaster ceilings or walls.

LOW-CLEARANCE LIGHT EMITTING DIODE LIGHTING

The present invention claims the benefit of U.S. Provisional Application No. 60/749,091 filed in the United States on Dec. 12, 2005, U.S. Provisional Application No. 60/765,717 filed in the United States on Feb. 7, 2006 and U.S. Provisional Application No. 60/774,200 filed in the United States on Feb. 17, 2006, which are hereby incorporated by reference in their entirety.

BACKGROUND OF THE INVENTION

1. Field of the Invention

The present invention relates to lighting, and more particularly, to low-clearance lighting. Although the present invention is suitable for a wide scope of applications, it is particularly suitable for providing low-clearance lighting for either drop-ceilings, drywall/plaster ceilings or walls.

2. Discussion of the Related Art

In general, drop-ceilings are typically installed in commercial buildings. However, drop-ceilings can also be installed in residences, such as during basement remodeling. FIG. 1A is a perspective view of a drop-ceiling having ceiling-grid with a lighting unit according to the related art. As shown in FIG. 1A, horizontal rails 1a and vertical rails 1b create a ceiling-grid 1 with openings in which ceiling tiles 2 are positioned. The ceiling-grid 1 shown in FIG. 1A is, for example, a two foot by two foot ceiling-grid. As also shown in FIG. 1A, the related art lighting unit 3, such as a fluorescent fixture, can also be positioned in the ceiling-grid 1. The related art lighting unit 3 has the same standard size or outside dimensions as the ceiling tiles 2.

Drop-ceilings are easy to install because the ceiling-grid can be hung by wire-hanger, which can be readily attached to the overhead ceiling. The use of the wire-hangars enables simple attachment and leveling of the drop-ceiling. A drop-ceiling covers up the electrical wires, ventilation equipment and plumbing that can run along an overhead ceiling. The electrical wires, ventilation equipment and plumbing above the drop-ceiling are easy to access through the ceiling-grid by removal of the ceiling tiles. However, a drop-ceiling requires a minimum clearance between the overhead ceiling and the drop-ceiling.

FIG. 1B is a cross-sectional view of a ceiling having ceiling-grid with a lighting unit along the line I-I' of FIG. 1A. As shown in FIG. 1B, the back of the related art lighting unit 3, which resides in an opening of the ceiling-grid 1, extends from the ceiling-grid 1 to a lighting unit height $H_{LU}$ above the ceiling-grid 1. The lighting unit height $H_{LU}$ above the ceiling-grid 1 can be about five to six inches, depending on the depth D of the related art lighting unit 3. A minimum insertion height $H_{MI}$ is needed in addition to the lighting unit height $H_{LU}$ so as to be able to insert the related art lighting unit 3 into the ceiling-grid 1. The minimum insertion height $H_{MI}$ of the related art lighting unit 3 can be about four to six inches. Thus, the minimal lighting clearance height $H_{MLC}$ that a drop-ceiling must have to receive the related art lighting unit is the sum of the lighting unit height $H_{LU}$ and the minimum insertion height $H_{MI}$, as shown in FIG. 1B. Accordingly, the minimal lighting clearance height $H_{MLC}$ that a drop-ceiling must have to receive the related art lighting unit can be about nine to twelve inches.

Typically, the minimum clearance between an overhead ceiling and a drop-ceiling is limited by the minimal lighting clearance height $H_{MLC}$. Thus, the minimal lighting clearance height $H_{MLC}$ of the related art lighting unit dictates the drop-ceiling height $H_{DC}$ over the floor, as shown in FIG. 1B. In other words, the maximum drop-ceiling height $H_{DC}$ is usually limited by the minimal lighting clearance height $H_{MLC}$.

Unlike drop-ceilings, a drywall/plaster ceiling is attached directly to either roof joists or floor joists. The related art lighting units in drywall/plaster ceilings are placed between the joists to accommodate the lighting unit height $H_{LU}$ of the related art lighting units. However, the size of the related art lighting units is limited to the spacing between floor/ceiling joists. Further, the placement of related art lighting units in a drywall/plaster ceiling is restricted because of the need for the related art lighting units to be placed between floor/ceiling joists.

SUMMARY OF THE INVENTION

Accordingly, the present invention is directed to low-clearance lighting that substantially obviates one or more of the problems due to limitations and disadvantages of the related art.

An object of the present invention is to provide lighting units with low overhead clearance.

Another object of the present invention is to provide three-dimensional lighting in ceilings.

Another object is to provide lighting fixtures configured to reside in ceiling-grids with low overhead clearance.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, low-clearance light emitting diode lighting includes at least one light guide panel, a plurality of light emitting diodes positioned on at least two side surfaces of the light guide panel, a reflecting plate at a back surface of the light guide panel, and a metal frame for supporting the at least one light guide panel and having exterior dimensions suitable for insertion into a ceiling-grid of a drop-ceiling.

In another aspect, a low-clearance light emitting diode lighting includes a metal frame having a plurality of openings, and a plurality of light tiles positioned respectively in the plurality of openings, wherein each of the light tiles has a light guide panel, a plurality of light emitting diodes positioned on at least two side surfaces of the light guide panel, and a reflector at a back surface of the light guide panel.

In another aspect, a low-clearance light emitting diode lighting includes a metal frame having a plurality of openings and a brace positioned between the plurality of openings to increase the rigidity of the metal frame, and a plurality of light tiles positioned respectively in the plurality of openings, wherein each of the light tiles has a light guide panel, a plurality of light emitting diodes positioned at a side surface of the light guide panel, and a reflector at a back surface of the light guide panel.

In another aspect, a low-clearance light emitting diode lighting includes a metal frame having a plurality of openings, and a plurality of light tiles positioned respectively in the plurality of openings, wherein each of the light tiles has a light guide panel, a plurality of light emitting diodes positioned on at least two side surfaces of the light guide panel, an upper reflecting part at a back surface of the light guide panel and partially surrounding the plurality of light emitting diodes positioned on at least two side surfaces of the light guide panel; and a lower reflecting part attached to the upper reflecting part for reflecting light from the plurality of light emitting diodes to the light guide panel and retaining the light guide panel within the upper and lower reflecting parts.

In yet another aspect, a low-clearance external electrode fluorescent lighting includes a metal frame having a plurality of openings and exterior dimensions suitable for insertion into a ceiling-grid of a drop-ceiling, and a plurality of light tiles positioned respectively in the plurality of openings, wherein each of the light tiles includes a plurality of external electrode fluorescent lights within an encasement and a reflector on the encasement.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1A:
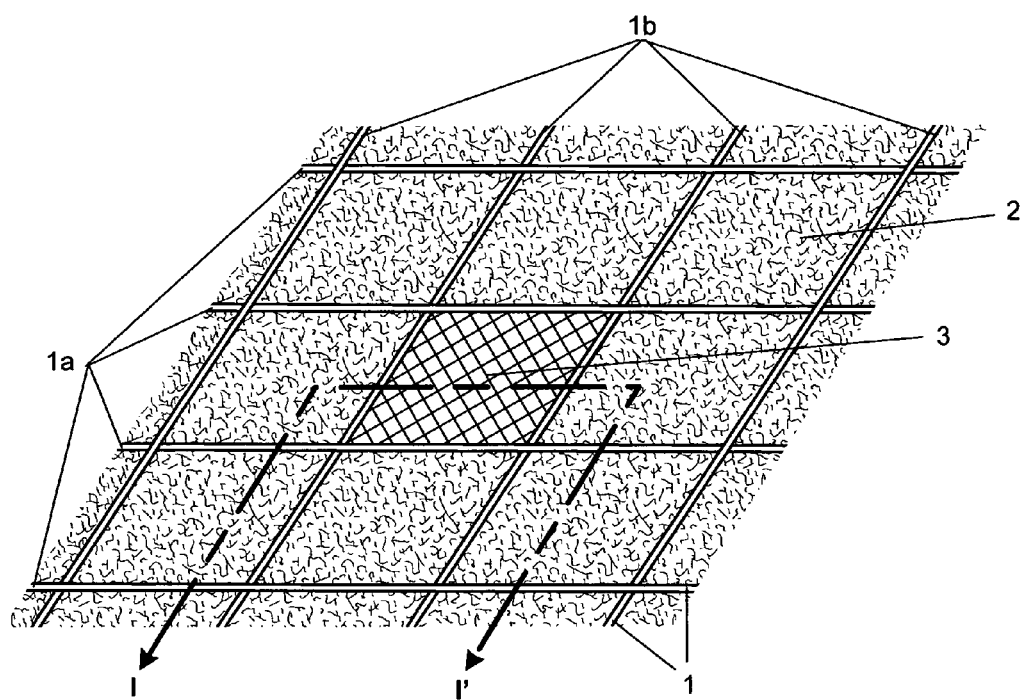
FIG. 1A is a perspective view of a drop-ceiling having ceiling-grid with a lighting unit according to the related art.

Reference will now be made in detail to the preferred embodiments of the present invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

Figure 2A:
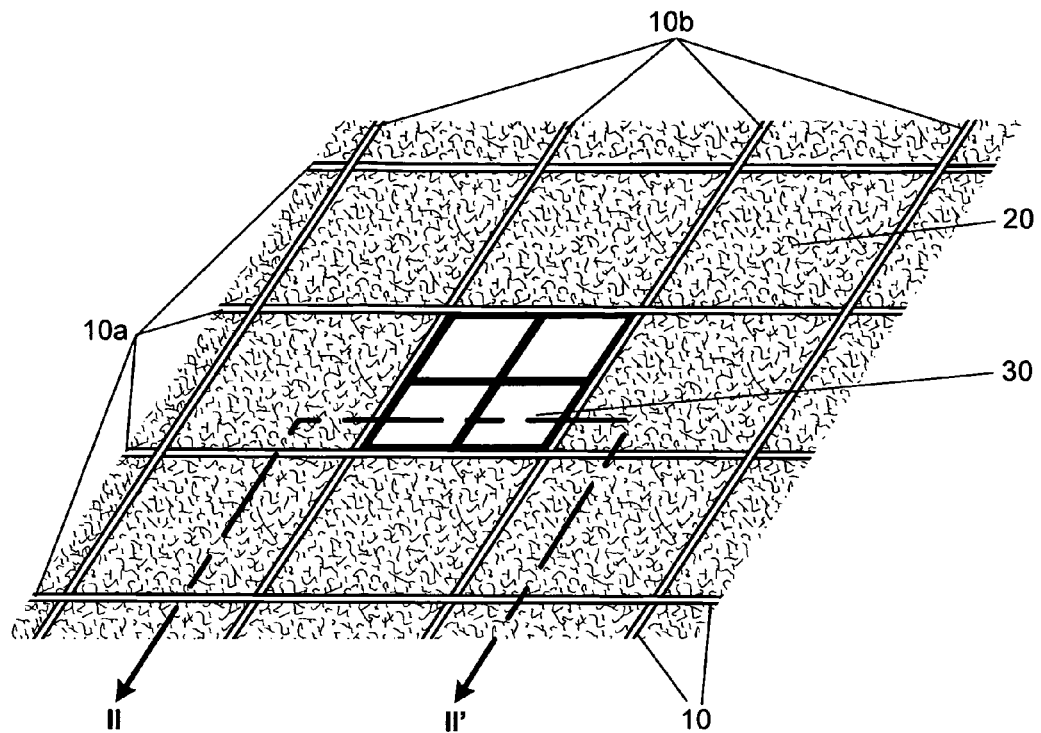
FIG. 2A is a perspective view of a ceiling-grid with a lighting unit according to a first embodiment of the present invention.

FIG. 2A is a perspective view of a ceiling-grid with a lighting unit according to a first embodiment of the present invention. As shown in FIG. 2A, horizontal rails 10a and vertical rails 10b create a ceiling-grid 10 having openings in which ceiling tiles 20 are positioned. The ceiling-grid 10 shown in FIG. 2A is, for example, a two foot by two foot ceiling-grid 10. As also shown in FIG. 2A, a low-clearance light emitting diode lighting unit 30 is positioned in an opening of the ceiling-grid 10. The low-clearance light emitting diode lighting unit 30 has a similar size or outside dimensions as the ceiling tiles 20. Although a two foot by two foot ceiling-grid 10 is shown in FIG. 2A, embodiments of the present invention can be implemented in two foot by four foot grid as well as other sizes of grids.

Figure 2B:
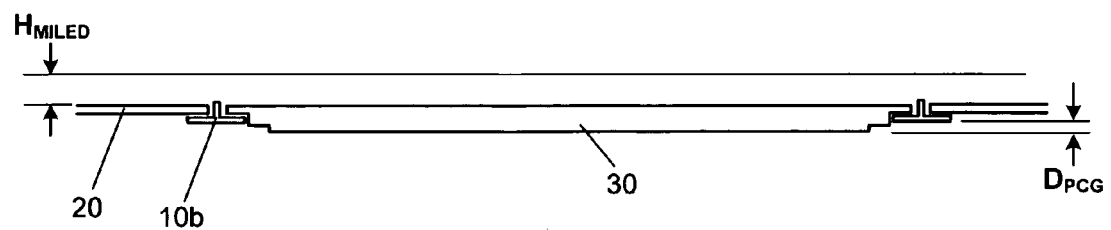
FIG. 2B is a cross-sectional view of a ceiling-grid with a lighting unit along the line II-II' of FIG. 2A.

FIG. 2B is a cross-sectional view of a ceiling-grid with a lighting unit along the line II-II' of FIG. 2A. As shown in FIG. 2B, the low-clearance light emitting diode lighting unit 30, which resides in an opening of the ceiling-grid 10, does not extend above the ceiling-grid 10. However, the low-clearance light emitting diode lighting unit 30 may have profile such that a portion of the low-clearance light emitting diode lighting unit 30 protrudes slightly with a protrusion distance $D_{PCG}$ from the ceiling-grid 10.

The low-clearance light emitting diode unit 30 has a minimum insertion height $H_{MILED}$ so as to be able to insert the low-clearance light emitting diode lighting unit 30 into ceiling-grid 10. The minimum insertion height $H_{MILED}$ can be about one to three inches. Thus, the minimal lighting clearance height that a drop-ceiling must have to receive the low-clearance light emitting diode lighting unit 30 is just the minimum insertion height $H_{MILED}$ of the low-clearance light emitting diode unit 30. Accordingly, the minimal lighting clearance height for the low-clearance light emitting diode lighting unit 30 is about one to three inches. Thus, the low-clearance light emitting diode lighting unit of embodiments of the present invention can affect an increase in the overall height between the floor and the low-clearance light emitting diode unit by raising a drop-ceiling as a result of only having to accommodate a small lighting clearance height of about one to three inches.

Figure 3:
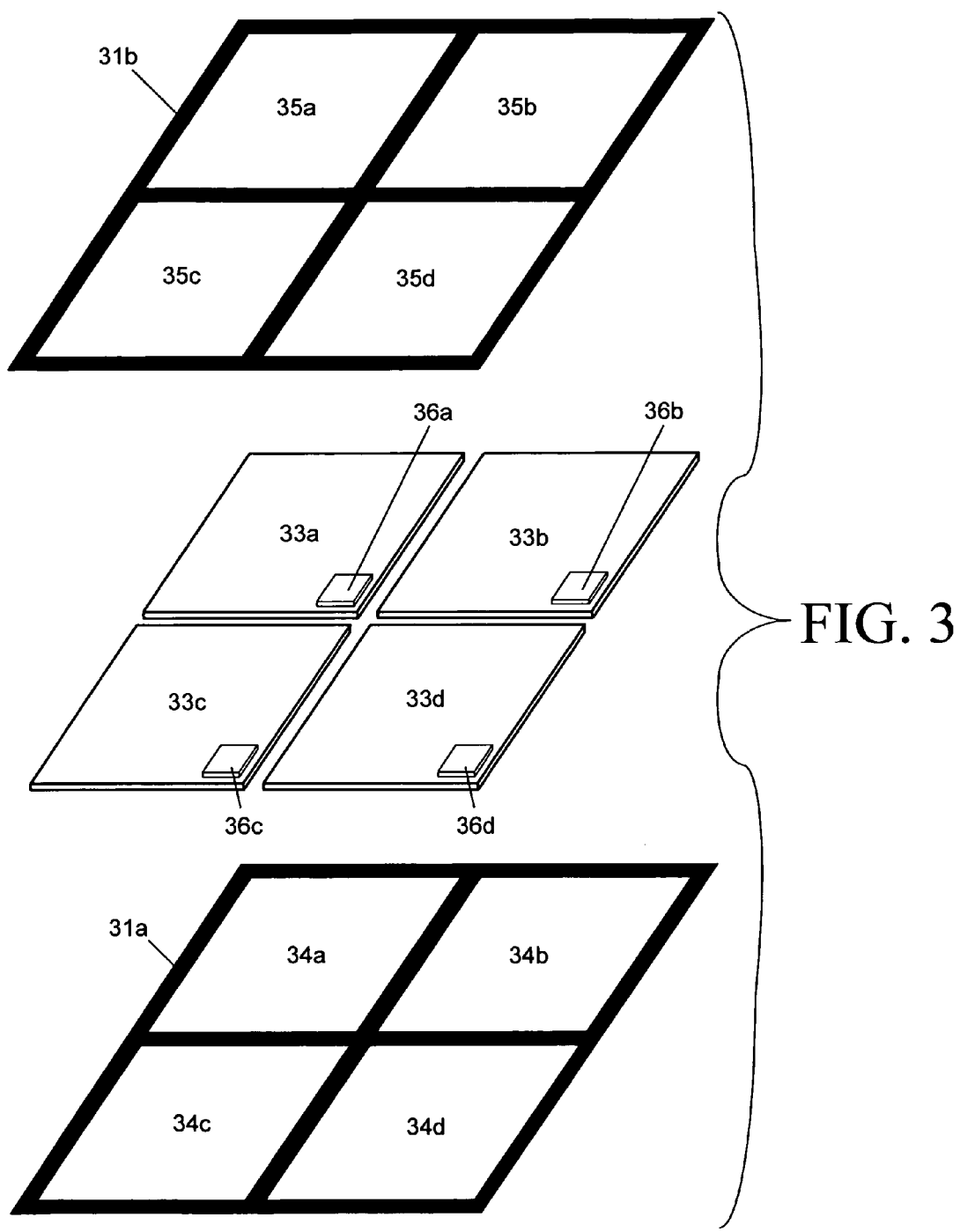
FIG. 3 is an exploded view generally showing the components of a low-clearance light emitting diode lighting unit according to the first embodiment of the present invention.

FIG. 3 is an exploded view generally showing the components of a low-clearance light emitting diode lighting unit according to a first embodiment of the present invention. As shown in FIG. 3, a low-clearance light emitting diode lighting unit generally includes at least one light tile 33 positioned between a lower frame member 31a and an upper frame member 31b that are attached together to make a frame for the at least one light tile 33. For example, four light tiles 33a, 33b, 33c and 33d can be respectively positioned in four openings 34a, 34b, 34c and 34d of the lower frame member 31a. Each of the four light tiles 33a, 33b, 33c and 33d respectively provide light through the four openings 34a, 34b, 34c and 34d of the lower frame member 31a. The upper frame member 31b also has four openings 35a, 35b, 35c and 35d respectively corresponding to the four light tiles 33a, 33b, 33c and 33d. The four openings 35a, 35b, 35c and 35d in the upper frame member 31b allow the power supplies 36a, 36b, 36c and 36d of the light tiles 33a, 33b, 33c and 33d to protrude into the upper frame member 31b so that the edges of the four light tiles 33a, 33b, 33c and 33d can be positioned on the upper frame member 31b.

Figure 4A:
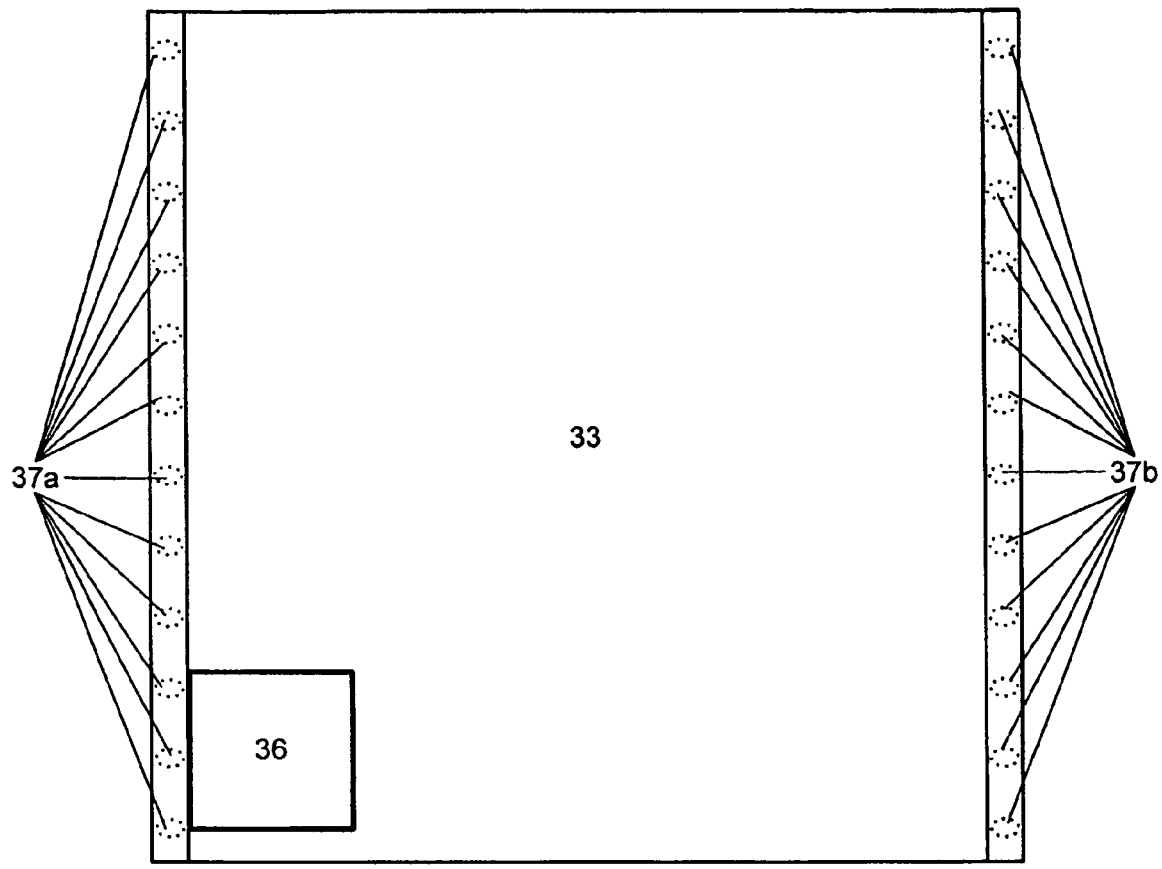
FIG. 4A is a bottom view of a light tile generally shown in FIG. 3 having light emitting diodes.

FIG. 4A is a bottom view of a light tile generally shown in FIG. 3 having light emitting diodes. As shown in FIG. 4A, a first set of light emitting diodes 37a is positioned on one side of the light tile 33 and a second set of light diodes 37b is position at a second side of the light tile 33. The first and second sets of light emitting diodes 37a and 37b can be on opposite sides of the light tile 33. Although the first and second sets of light emitting diodes 37a and 37b are shown directly opposing each other in FIG. 4A, the first and second sets of light emitting diodes 37a and 37b can be on opposite sides of the light tile 33 but yet offset from one another. Further, an additional set or sets of light emitting diodes can be provided at another side or other sides of the light tile to increase light output from the light tile.

Figure 4B:
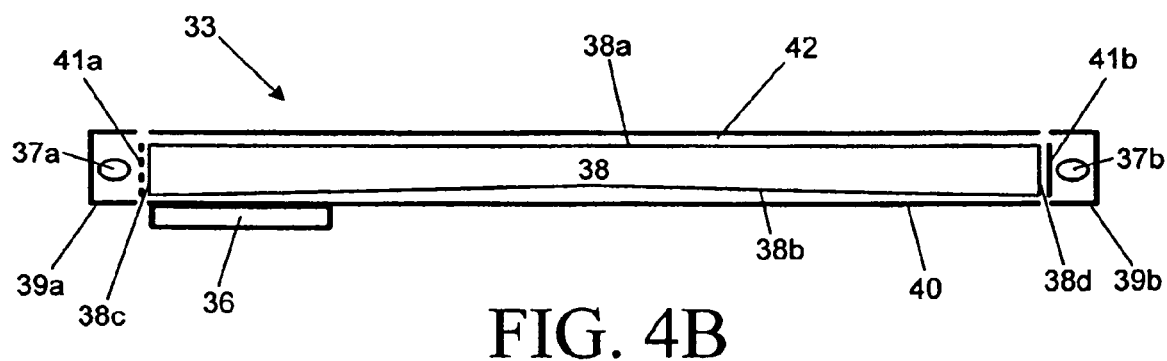
FIG. 4B is a side view of the light tile shown in FIG. 3.

FIG. 4B is a side view of one of the light tiles generally shown in FIG. 3. As shown in FIG. 4B, a light tile 33 includes a light guide panel 38 for receiving light from the light emitting diodes 37a and 37b and then distributes the light across the front surface 38a of the light guide panel 38. A reflector plate 40 on the back surface 38b of the light guide panel 38 reflects light toward the front surface 38a of the light guide panel 38. Light emitting diode reflectors 39a and 39b reflect light from the light emitting diodes 37a and 37b toward the at least two side surfaces 38c and 38d of the light guide panel 38. A power supply 36 is mounted on the reflecting plate 40 at the back surface of the light tile 33. The power supply 36 can convert 120 VAC to 12 VDC to drive the light emitting diodes 37a and 37b, for example.

The light emitting diodes 37a and 37b can be white light emitting diodes. In the alternative, the light emitting diodes 37a and 37b can include red, blue and green light emitting diodes that are positioned along the sides of the light guide panel 38 such that the red, blue and green lights from the red, blue and green light emitting diodes combines into white light. In another alternative, the light emitting diodes 37a and 37b can be blue light emitting diodes. In yet another alternative, the light emitting diodes 37a and 37b can be ultraviolet light emitting diodes. In the cases of blue light emitting diodes and ultraviolet light emitting diodes, a color conversion structure is needed to convert the blue light or the ultraviolet light into white light.

As shown in FIG. 4B, the color conversion structure can either be a pair of color conversion films 41a and 41b at the at least two side surfaces 38c and 38d of the light guide panel 38 or a single color conversion film 42 at the front surface 38a of the light guide panel 38. For example, the pair of color conversion films 41a and 41b can be positioned directly on the at least two side surfaces 38c and 38d of the light guide panel 38 that face the light emitting diodes 37a and 37b. In another example, the single color conversion film 42 can be positioned directly on the front surfaces 38a of the light guide panel 38. The color conversion structure converts ultraviolet light to white light or blue light to white light.

Figure 5:
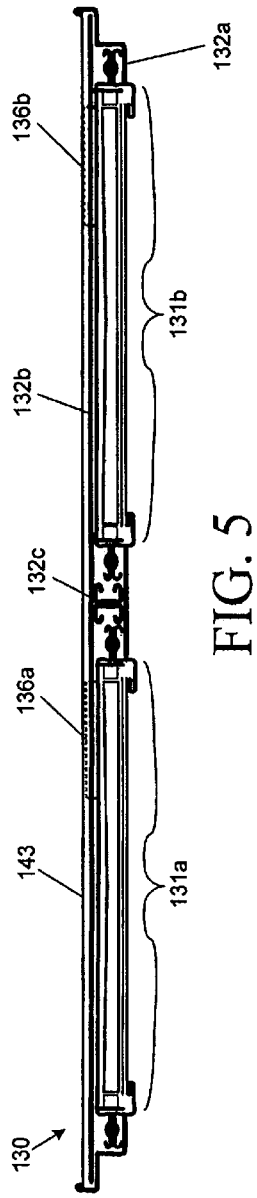
FIG. 5 is a cross-sectional view of a low-clearance light emitting diode lighting unit according to a second embodiment of the present invention.

FIG. 5 is a cross-sectional view of a low-clearance light emitting diode lighting unit according to a second embodiment of the present invention. As shown in FIG. 5, a low-clearance light emitting diode lighting unit 130 includes a first light tile 131a and a second light tile 131b positioned between a lower frame member 132a and an upper frame member 132b. In addition, a brace 132c can be attached to the lower frame member 132a to increase the overall rigidity of the frame composed of lower and upper frame members 132a and 132b, respectively. For example, the brace 132c can be an I-beam, as shown in FIG. 5. In the alternative, the brace 132c can be a C-channel or a box channel beam.

After the brace 132c is attached, the first light tile 131a and the second light tile 131b are positioned on the lower frame member 132a such that the brace 132c separates the first and second light tiles 131a and 131b. The upper frame member 132b is then attached to the lower frame member 132a so as to encase the edges of the first and second light tiles 131a and 131b. Thus, the metal of the lower and upper frame members 132a and 132b can remove heat from the first and second light tiles 131a and 131b caused by the operation of the light emitting diodes in the first and second light tiles 131a and 131b. A backer board 143 can be attached to the upper frame member 132b to cover the power supplies 136a and 136b on the back surfaces of the first and second light tiles 131a and 131b.

Figure 6:
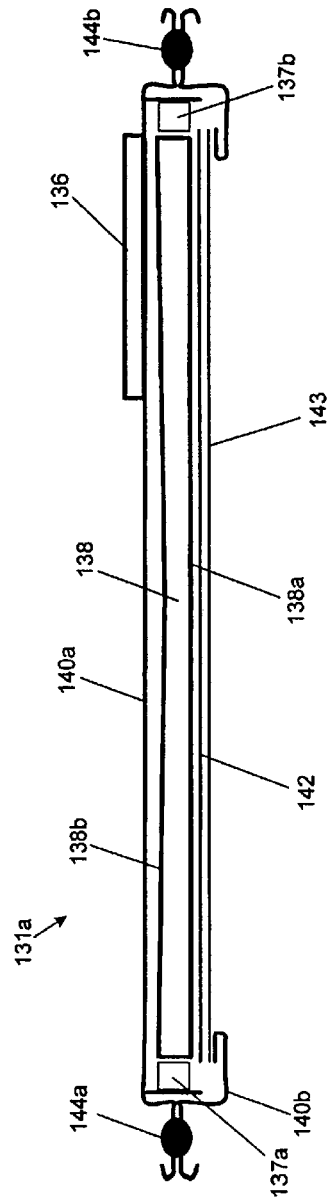
FIG. 6 is a cross-sectional view of a lighting tile shown in FIG. 5.

FIG. 6 is a cross-sectional view of a lighting tile shown in FIG. 5.

As shown in FIG. 6, a light tile 131a includes first and second sets of light emitting diodes 137a and 137b at opposite sides of the light tile 131a. Alight guide panel 138 receives light from the first and second sets of light emitting diodes 137a and 137b and then distributes the light across the front surface 138a of the light guide panel 138. A back reflector part 140a is positioned on a back surface 138b of the light guide panel 138 and also partially surrounds the light emitting diodes 137a and 137b so as to reflect light toward a front surface 138a of the light guide panel 138 and reflect light from the light emitting diodes 137a and 137b towards the light guide panel 138. A power supply 136 is mounted on the back reflecting part 140a at the back surface of the light tile 131a.

A single color conversion film 142 is positioned at the front surface 138a of the light guide panel 138. A diffusion sheet 143 is on the single color conversion film 142 at the front surface 138a of the light guide panel 138. A front reflector part 140b is positioned at the front surface 138a of the light guide panel 138 and also partially surrounds the light emitting diodes 137a and 137b so as to reflect light toward a front surface 138a of the light guide panel 138. The front reflector part 140b is attached to the back reflector part 140a with, for example, rivets 144a and 144b so that the front and back reflector parts 140a and 140b encase the first and second sets of light emitting diodes 137a and 137b, the light guide panel 138, the single color conversion film 142 and the diffusion sheet 143.

Figure 7:
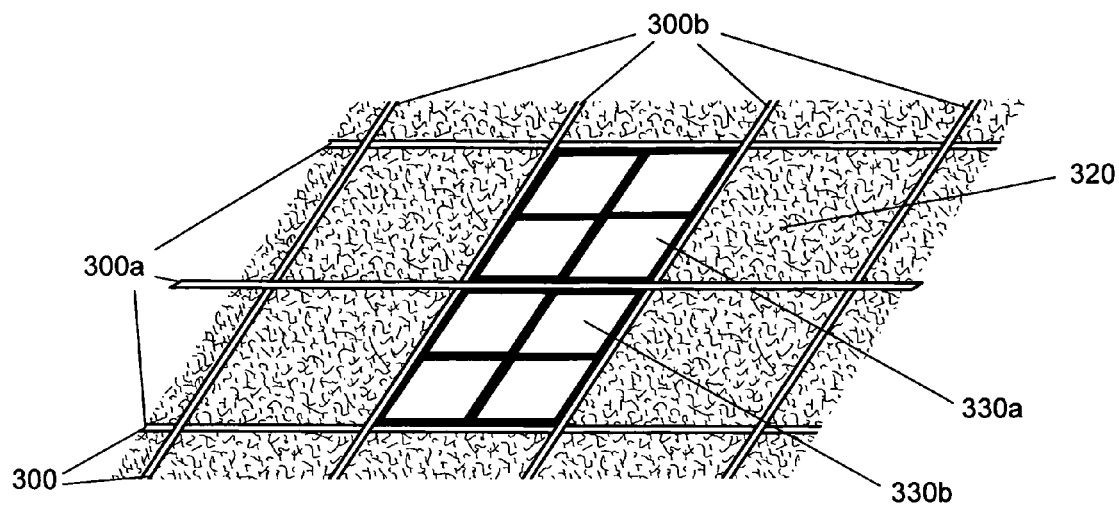
FIG. 7 is a perspective view of a ceiling-grid with a low-clearance light emitting diode lighting unit according to the second embodiment of the present invention.

FIG. 7 is a perspective view of a ceiling-grid with a low-clearance light emitting diode lighting unit according to a second embodiment of the present invention. As shown in FIG. 7, horizontal rails 300a and vertical rails 300b create a ceiling-grid 300 with openings in which ceiling tiles 320 are positioned. As also shown in FIG. 7, a first low-clearance light emitting diode lighting unit 330a is positioned in an opening of the ceiling-grid 300 and a second low-clearance light emitting diode lighting unit 330b is positioned in an opening of the ceiling-grid 300 that is immediately adjacent to the first low-clearance light emitting diode lighting unit 330a. The first and second low-clearance light emitting diode lighting units 330a and 330b have a standard size or outside dimensions similar to the ceiling tiles 320 so as to be suitable for insertion into the ceiling-grid 300 of a drop-ceiling.

Figure 8:
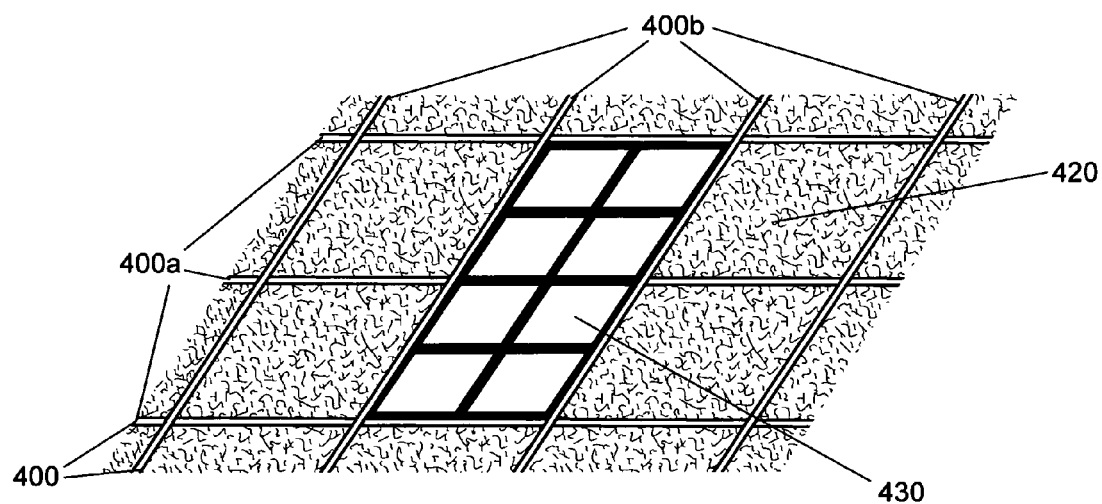
FIG. 8 is a perspective view of a ceiling-grid with a low-clearance light emitting diode lighting unit according to a third embodiment of the present invention.

FIG. 8 is a perspective view of a ceiling-grid with a low-clearance light emitting diode lighting unit according to a third embodiment of the present invention. As shown in FIG. 8, horizontal rails 400a and vertical rails 400b create a ceiling-grid 400 with openings in which ceiling tiles 420 are positioned. As also shown in FIG. 8, a low-clearance light emitting diode lighting unit 430 is positioned in an opening of the ceiling-grid 400. The low-clearance light emitting diode lighting unit 430 in FIG. 8 has a standard size or exterior dimensions as two adjacent ceiling tiles 420 within the ceiling-grid. In other words, the low-clearance light emitting diode lighting unit 430 fills a space in the grid that could otherwise receive two adjacent ceiling tiles 420 and the portion of the ceiling-grid 400 between the two adjacent ceiling tiles 420. Thus, by removing a portion of the ceiling-grid 400 between two adjacent openings in the ceiling-grid 400, the low-clearance light emitting diode lighting unit 430 in FIG. 8 has a standard size or outside dimensions suitable for insertion into the ceiling-grid 300 of a drop-ceiling.

Figure 9A:
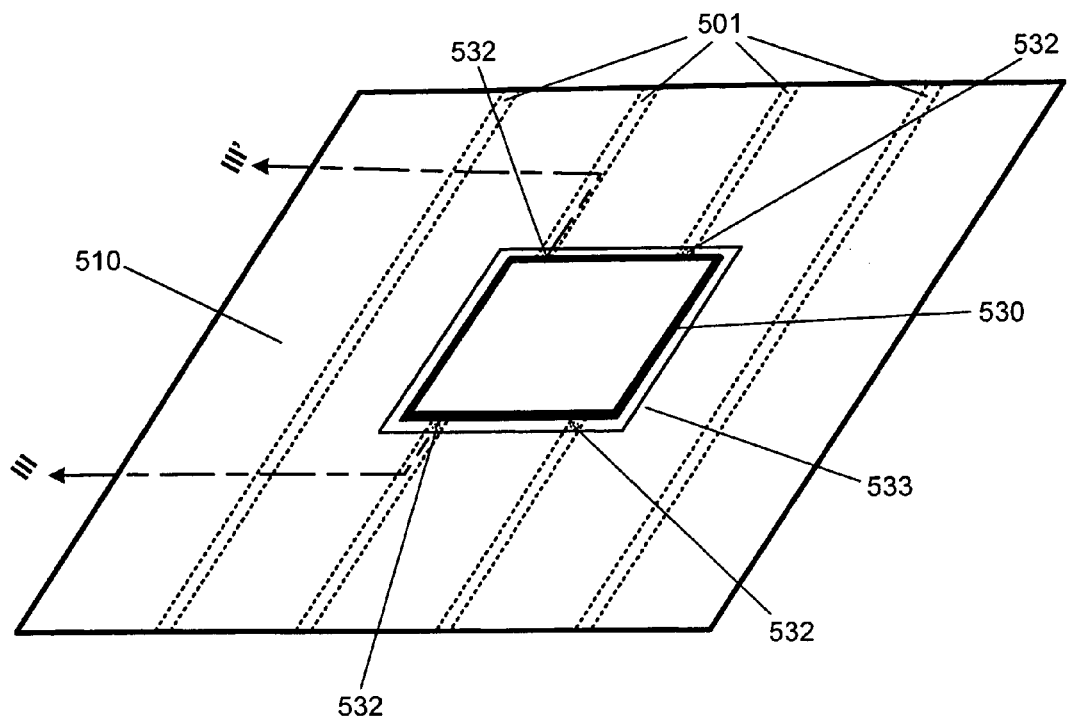
FIG. 9A is a perspective view of a ceiling having a low-clearance light emitting diode lighting unit according to a fourth embodiment of the present invention.

FIG. 9A is a perspective view of a ceiling having a low-clearance light emitting diode lighting unit according to a fourth embodiment of the present invention. As shown in FIG. 9A, ceiling joists 501 support a ceiling 510, such as a drywall or plaster ceiling. As also shown in FIG. 9A, a low-clearance light emitting diode lighting unit 530 is mounted on the ceiling 510 with mounting hardware 532. A trim piece cover 533 about the periphery of the low-clearance light emitting diode lighting unit 530 covers the mounting hardware 532.

Figure 9B:
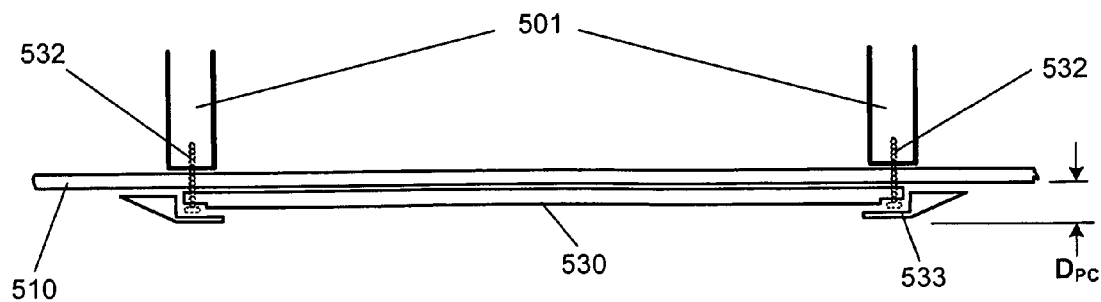
FIG. 9B is a cross-sectional view of a drywall/plaster ceiling with a low-clearance light emitting diode lighting unit along the line III-III' of FIG. 9A.

FIG. 9B is a cross-sectional view of a ceiling with a low-clearance light emitting diode lighting unit along the line III-III' of FIG. 9A. As shown in FIG. 9A, the mounting hardware 532, such as a lag screw, goes through the metal frame at the periphery of the low-clearance light emitting diode lighting unit 530 to attach the low-clearance light emitting diode lighting unit 530 to the ceiling 510. The low-clearance light emitting diode lighting unit 530 can be attached to at two ceiling joist 501 through the ceiling 510, as shown in FIG. 9B. Alternatively, the low-clearance light emitting diode lighting unit 530 can be attached to just one ceiling joist. Further, the low-clearance light emitting diode lighting unit 530 could just be attached directly to the ceiling 510.

Although the fourth embodiment of the present invention is described with regard to mounting a low-clearance light emitting diode lighting unit on a ceiling, the low-clearance light emitting diode lighting unit of the fourth embodiment can also be mounted on a wall. Instead of ceiling joists, the low-clearance light emitting diode lighting unit of the fourth embodiment can be attached to the wall studs of a wall or just directly attached to a wall. Further, the low-clearance light emitting diode lighting unit of the fourth embodiment can be mounted directly on the ceiling joists such that the low-clearance light emitting diode lighting unit of the fourth embodiment is slightly recessed into the ceiling. Furthermore, the low-clearance light emitting diode lighting unit of the fourth embodiment can be mounted directly on the wall studs such that the low-clearance light emitting diode lighting unit of the fourth embodiment is slightly recessed into the wall.

The low-clearance light emitting diode lighting unit 530 shown in FIG. 9B only has a protrusion distance $D_{PC}$ from the ceiling of about one to three inches. Thus, the low-clearance light emitting diode lighting unit 530 can be mounted on a ceiling low-clearance light emitting diode lighting unit affecting the overall height between the floor and the low-clearance light emitting diode lighting unit 530. The low-clearance light emitting diode lighting unit of the fourth embodiment of the present invention allows for more freedom in the placement of the lighting unit in that the low-clearance light emitting diode lighting unit can be mounted anywhere on a ceiling. Further, the low-clearance light emitting diode lighting unit of the fourth embodiment can be mounted on a wall without significantly protruding from the wall.

Figure 10:
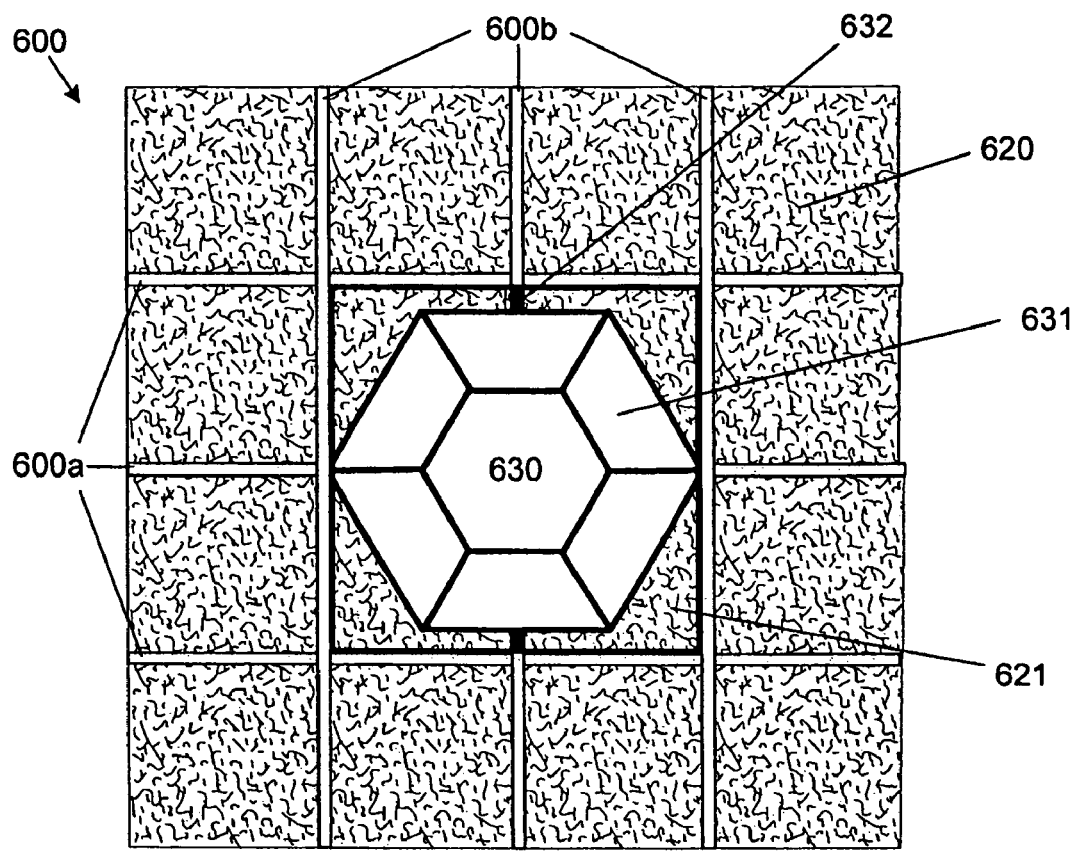
FIG. 10 is a bottom view of a ceiling having ceiling-grid with a low-clearance light emitting diode lighting unit according to a fifth embodiment of the present invention.

FIG. 10 is a bottom view of a ceiling having ceiling-grid with a low-clearance light emitting diode lighting unit according to a fifth embodiment of the present invention. As shown in FIG. 10, horizontal rails 600a and vertical rails 600b create a ceiling-grid 600 with openings in which ceiling tiles 620 are positioned. As also shown in FIG. 10, a low-clearance light emitting diode lighting unit 630 is positioned in an opening of the ceiling-grid 600. The low-clearance light emitting diode lighting unit 630 in FIG. 10 has a standard size or exterior dimensions as a block of four adjacent ceiling tiles 620 within the ceiling-grid. In other words, the low-clearance light emitting diode lighting unit 630 fills a space in the grid that could otherwise receive a block of four adjacent ceiling tiles 620 and the portions of the ceiling-grid 600 between the two adjacent ceiling tiles 620. Thus, by removing portions of the ceiling-grid 600 between a block of four adjacent openings in the ceiling-grid 600, the low-clearance light emitting diode lighting unit 630 in FIG. 10 has a standard size or outside dimensions suitable for insertion into the ceiling-grid 600 of a drop-ceiling.

Figure 1B:
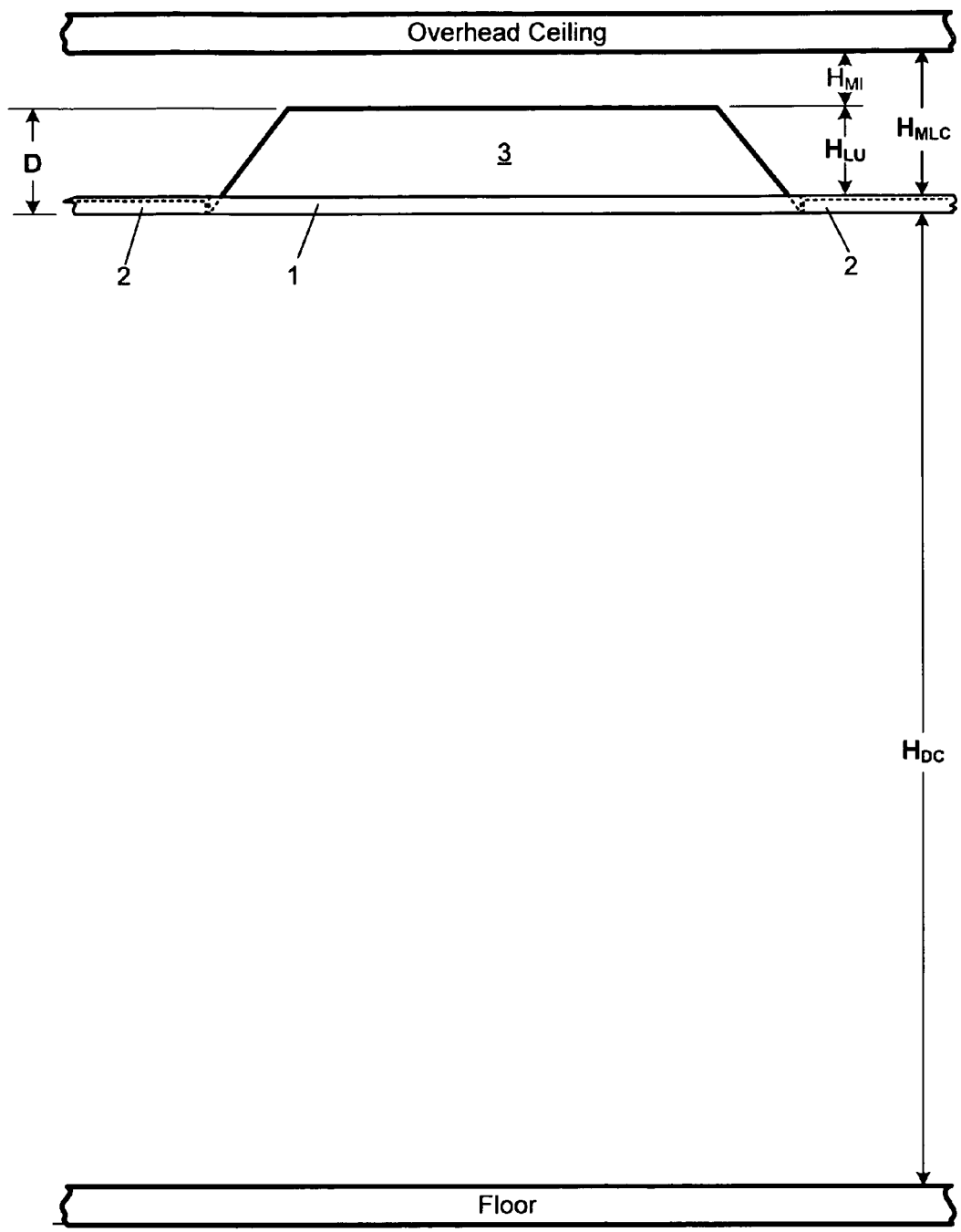
FIG. 1B is a cross-sectional view of a ceiling having ceiling-grid with a lighting unit along the line I-I' of FIG. 1A.
Figure 11:
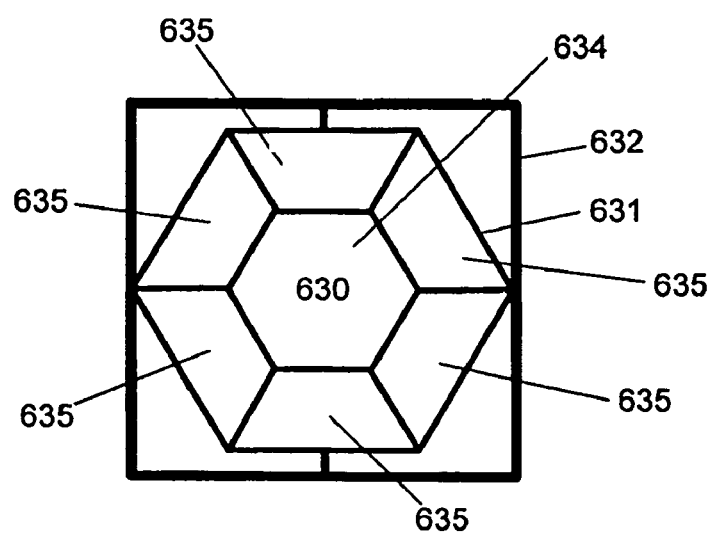
FIG. 11 is a bottom view of the a low-clearance light emitting diode lighting unit shown in FIG. 10.

FIG. 11 is a bottom view of the low-clearance light emitting diode lighting unit shown in FIG. 10. As shown in FIG. 1, the low-clearance light emitting diode lighting unit 630 includes a group of protruding lighting panels 631 in a supporting frame 632. The standard size or outside dimensions of the low-clearance light emitting diode lighting unit 630 is defined by the supporting frame 632. The group of protruding lighting panels 631 has a shape different from the supporting frame 632 such that there are gaps 633 between the group of protruding lighting panels 631 and the supporting frame 632. As shown in FIG. 10, the gaps 633 are filled with cut-tiles 621, which are ceiling tiles cut to the appropriate shape to fill the gaps 633, when the low-clearance light emitting diode lighting unit 630 is mounted in a drop-ceiling.

Figure 12:
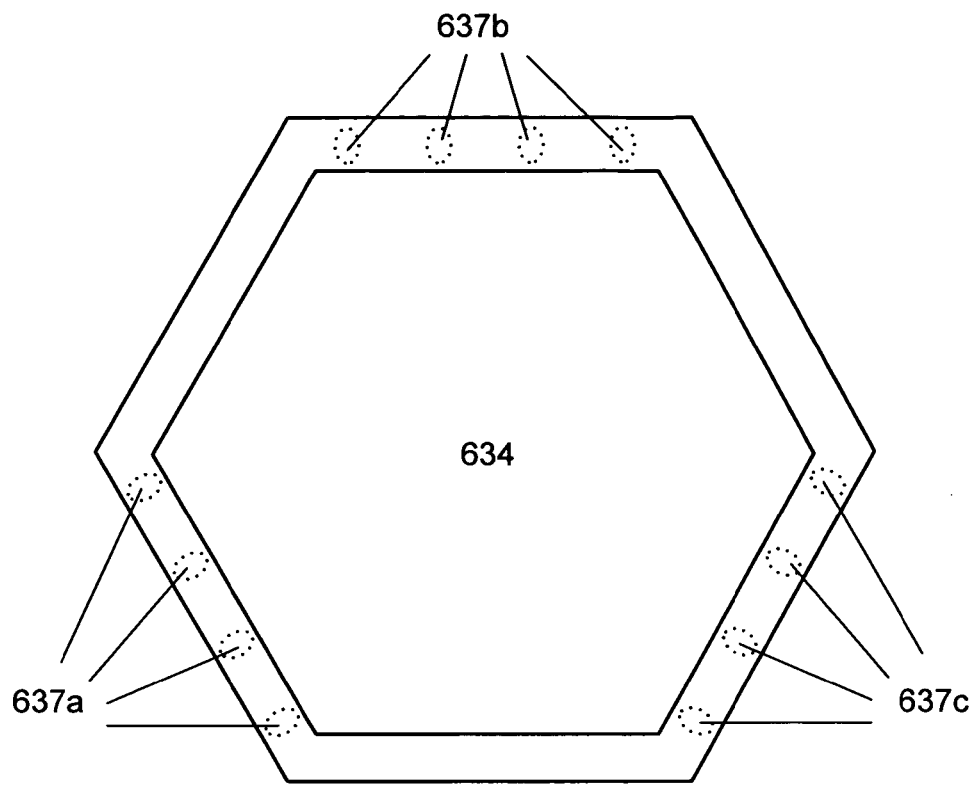
FIG. 12 is a bottom view of the hexagonal-shaped light tile shown in FIG. 10.

FIG. 12 is a bottom view of the hexagonal-shaped light tile shown in FIG. 10. As shown in FIG. 12, a first set of light emitting diodes 637a is positioned on one side of the hexagonal-shaped light tile 634, a second set of light diodes 637b is position at a second side of the light tile 633, and a third set of light diodes 637b is position at a third side of the hexagonal-shaped light tile 634. Preferably, the first, second, and third sets of light emitting diodes 637a, 637b and 37c should be on every other side of the hexagonal-shaped light tile 634. In the alternative, the light emitting diodes can be just on two opposing sides of the hexagonal-shaped light tile 634.

Figure 13:
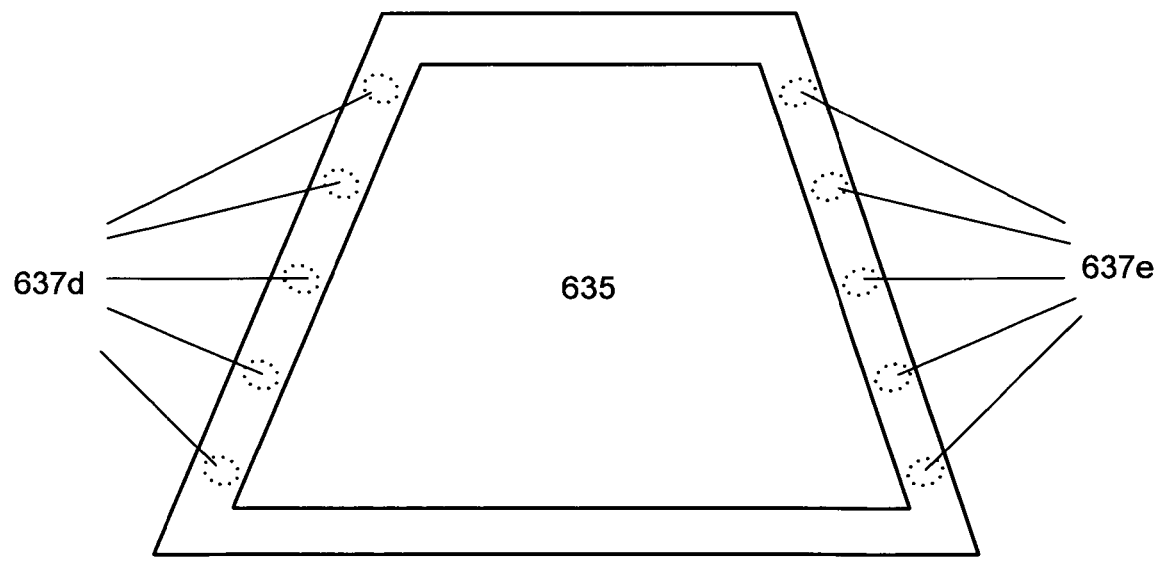
FIG. 13 is a bottom view of one of the trapezoidal-shaped light tiles shown in FIG. 10.

FIG. 13 is a bottom view of one of the trapezoidal-shaped light tiles shown in FIG. 10. As shown in FIG. 13, a fourth set of light emitting diodes 637d is positioned on one side of the trapezoidal-shaped light tile 635 and a fifth set of light diodes 637e is position at a second side of the trapezoidal-shaped light tile 635. Preferably, the third and fourth sets of light emitting diodes 637d and 637e should be on opposite sides of the trapezoidal-shaped light tile 635. In the alternative, an additional set or sets of light emitting diodes can be provided at another side or other sides of the light tile to increase light output from the trapezoidal-shaped light tile 635.

Figure 14:
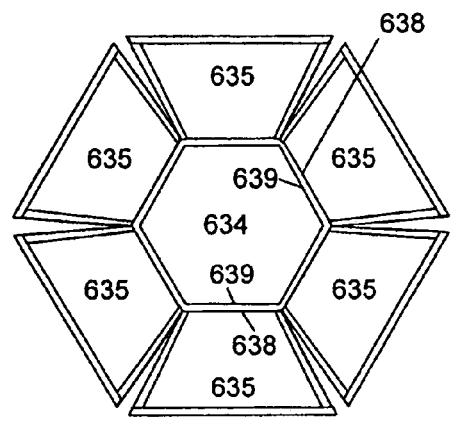
FIG. 14 is a bottom view of the hexagonal-shaped light tile shown in FIG. 12 attached to the trapezoidal-shaped light tiles shown in FIG. 13.
Figure 15:
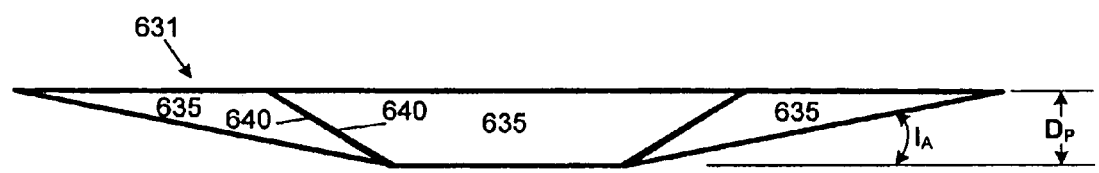
FIG. 15 is a side view of the frame for supporting the trapezoidal-shaped light tiles shown in FIG. 13 attached to each other and the hexagonal-shaped light tile shown in FIG. 12.

The light emitting diodes 637a, 637b, 637c, 637d and 637e can be white light emitting diodes. In the alternative, the light emitting diodes 637a, 637b, 637c, 637d and 637e can include red, blue and green light emitting diodes that are positioned along the sides of the light tiles such that the red, blue and green lights from the red, blue and green light emitting diodes combines into white light. In another alternative, the light emitting diodes 637a, 637b, 637c, 637d and 637e can be blue light emitting diodes. In yet another alternative, the light emitting diodes 637a, 637b, 637c, 637d and 637e can be ultraviolet light emitting diodes. In the cases of blue light emitting diodes and ultraviolet light emitting diodes, a color conversion structure is needed to convert the blue light or the ultraviolet light into white light FIG. 14 is a bottom view of the hexagonal-shaped light tile shown in FIG. 12 attached to the trapezoidal-shaped light tiles shown in FIG. 13 and FIG. 15 is a side view of the frame for supporting the trapezoidal-shaped light tiles shown in FIG. 13 attached to each other and the hexagonal-shaped light tile shown in FIG. 12. As shown in FIG. 14, a top side 638 of each of the six trapezoidal-shaped light tiles 635 is attached to a side 639 of the side of the hexagonal-shaped light tile 634. Then, as shown in FIG. 15, the sides 640 of each of the adjacent trapezoidal-shaped light tiles 635 are attached to each other to form the group of protruding lighting panels 631. The group of protruding lighting panels 631 protrudes a distance $D_P$ from the ceiling to provide three-dimensional lighting while maintaining low-clearance characteristics. The six trapezoidal-shaped light tiles 635 have an inclination angle $I_A$ of five to thirty degrees, for example, so as to position the six trapezoidal-shaped light tiles 635 to more radially disperse the light. In other words, the group of protruding lighting panels 631 of the fifth embodiment of the present invention provides light to a wider area than the more planar low-clearance light emitting diode lighting unit 30 shown in FIG. 2A.

Figure 16:
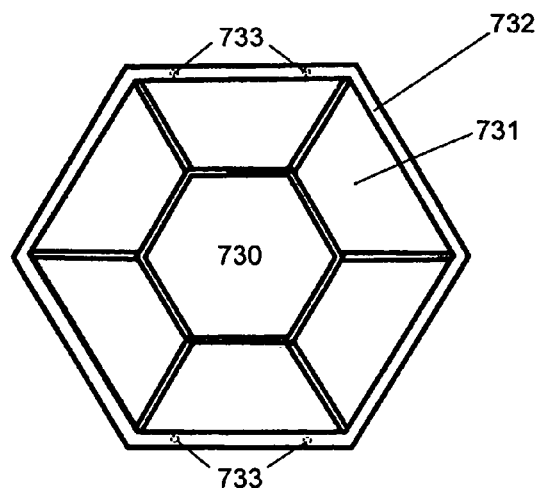
FIG. 16 is a bottom view of a low-clearance light emitting diode lighting unit according to a sixth embodiment of the present invention.

FIG. 16 is a bottom view of a low-clearance light emitting diode lighting unit according to a sixth embodiment of the present invention. As shown in FIG. 16, a low-clearance light emitting diode lighting unit 730 can just be a group of protruding lighting panels 731. A trim piece cover 732 about the periphery of the low-clearance light emitting diode lighting unit 730 covers the mounting hardware 733 for mounting the low-clearance light emitting diode lighting unit 730 to a ceiling or wall.

Figure 17A:
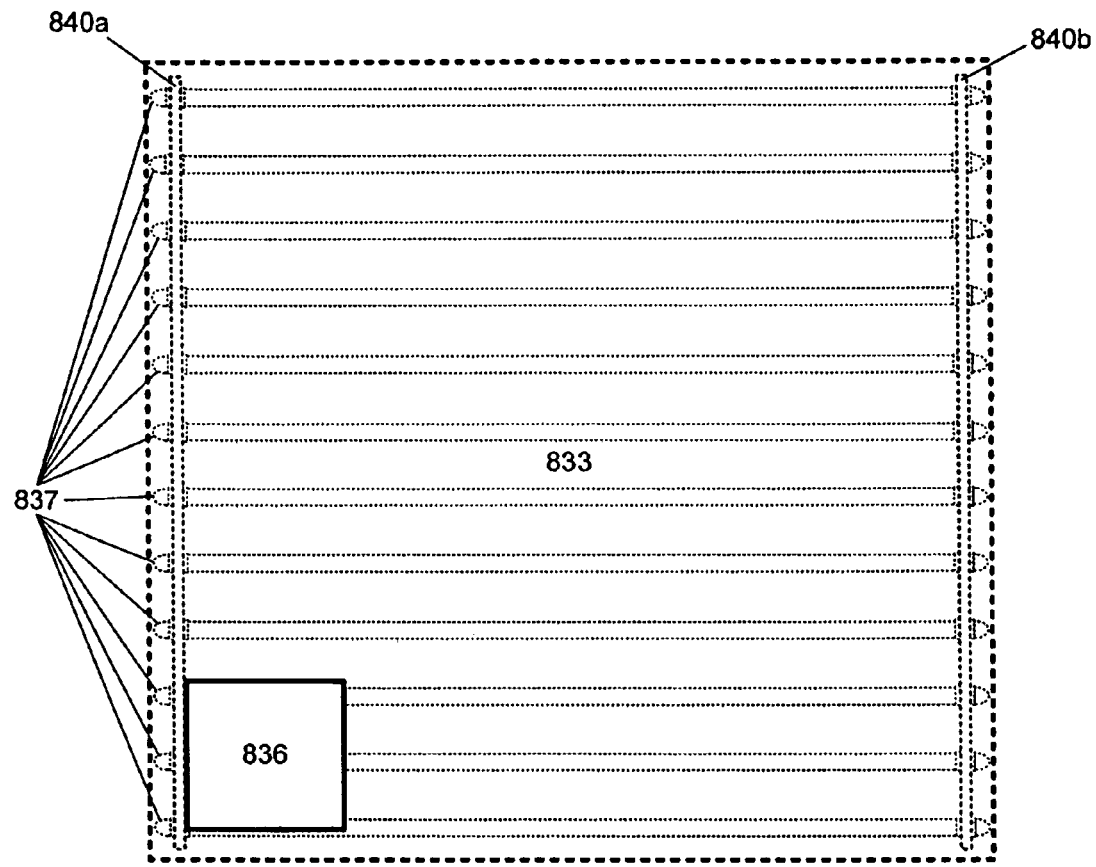
FIG. 17A is a bottom view of a light tile generally shown in FIG. 3 having fluorescent tubes according to a seventh embodiment of the present invention.

FIG. 17A is a bottom view of a light tile generally shown in FIG. 3 having fluorescent tubes according to a seventh embodiment of the present invention. As shown in FIG. 17, a plurality of external electrode fluorescent lights (EEFLS) fluorescent tubes 837 are positioned within the light tile 833 instead of light emitting diodes. One side of each of the plurality of fluorescent tubes 837 is covered by a first common electrode 840a and the other side of each of the plurality of fluorescent tubes 837 are covered by a second common electrode 840b. The light tile 833 having external electrode fluorescent lights (EEFLS) fluorescent tubes 837 can be implemented as low-clearance like previously described for light tiles having light emitting diodes.

Figure 17B:
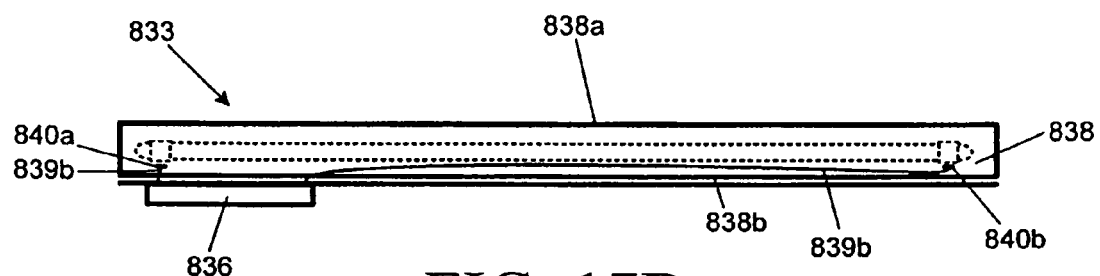
FIG. 17B is a side view of the light tile shown in FIG. 17A.

FIG. 17B is a side view of the light tile shown in FIG. 17A. As shown in FIG. 17B, a light tile 833 includes plurality of fluorescent tubes 837 within an encasement 838. A reflector plate 840 on the back surface 838b of the encasement 838 to reflect light toward the front surface 838a of the light guide panel 838. In the alternative, the reflector plate 840 can be within the encasement 838 to reflect light toward the front surface 838a of the light guide panel 838. A power supply 836 is attached to the bottom surface 838b of the encasement. The power supply 836 can transform 120 VAC at 60 Hz to 1000 VAC at 40 KHz, for example. Wires 839a and 839b are connected between the power supply 836 and the first and second common electrodes 840a and 840b, respectively.

It will be apparent to those skilled in the art that various modifications and variations can be made to low-clearance lighting of the present invention without departing from the spirit or scope of the invention. Thus, it is intended that the present invention cover the modifications and variations of this invention provided they come within the scope of the appended claims and their equivalents.

What is claimed is:

1. A low-clearance light emitting diode lighting, comprising:
   at least one light tile, including:
      a light guide panel;
      a plurality of light emitting diodes positioned on at least two side surfaces of the light guide panel;
      a reflecting plate at a back surface of the light guide panel;
      reflectors positioned on the light tile and having reflecting surfaces at two opposing sides of each of the plurality of light emitting diodes; and
   a metal frame having an upper frame member and a lower frame member supporting the at least one light tile on a ceiling-grid of a drop-ceiling and removing heat from the plurality of light emitting diodes wherein the at least one light tile is sandwiched between the lower metal frame and the upper metal frame, and,
   wherein the metal frame lower has a stepped section with first, second and third contiguous portions in which the first portion contacts the ceiling-grid, the second portion protrudes below the ceiling-grid, and the third portion contacts the light tile and is positioned below the ceiling grid such that a portion of the ceiling-grid is above the low-clearance light emitting diode lighting.

2. The low-clearance light emitting diode lighting of claim 1, wherein the metal frame supports and surrounds a plurality of light tiles and includes a brace positioned between the plurality of light tiles and within the frame to increase the rigidity of the metal frame.

3. The low-clearance light emitting diode lighting of claim 1, wherein a power supply is mounted on the reflecting plate of the at least one light tile to provide power to the plurality of light emitting diodes on the at least one light tile.

4. The low-clearance light emitting diode lighting of claim 3, wherein the plurality of light emitting diodes includes green light emitting diodes, blue light emitting diodes and red light emitting diodes.

5. The low-clearance light emitting diode lighting of claim 1, wherein the plurality of light emitting diodes includes one of a blue light emitting diode and an ultraviolet light emitting diode.

6. The low-clearance light emitting diode lighting of claim 5, further comprising a color conversion film on a front side of the light guide panel.

7. The low-clearance light emitting diode lighting of claim 5, further comprising a color conversion films on the at least two side surfaces of the light guide panel adjacent to the plurality of light emitting diodes.

8. The low-clearance light emitting diode lighting of claim 1, wherein the frame supports light guide panels having different shapes.

9. A low-clearance light emitting diode lighting, comprising:
a lower metal frame having a plurality of openings, a stepped section, and exterior dimensions suitable for insertion into a ceiling-grid of a drop-ceiling such that the metal frame can be positioned on the ceiling-grid of the drop-ceiling, the stepped section having first, second and third contiguous portions in which the first surface portion contacts the ceiling-grid, the second portion protrudes below the ceiling-grid and the third portion is positioned below the ceiling-grid such that a portion of the ceiling-grid is above the low-clearance light emitting diode lighting; and
a plurality of light tiles positioned respectively in the plurality of openings such that a periphery of each of the plurality of light tiles is surrounded by the lower metal frame and contacts the third portion of the lower metal frame; an upper metal frame sandwiching the plurality of light tiles between the lower metal frame and the upper metal frame,
wherein each of the plurality of light tiles includes a light guide panel, a plurality of light emitting diodes positioned on at least two side surfaces of the light guide panel, a reflector at a back surface of the light guide panel, and reflecting surfaces at two opposing sides of each of the plurality of light emitting diodes.

10. The low-clearance light emitting diode lighting of claim 9, wherein each of the light tiles includes a power supply mounted on the reflecting plate.

11. The low-clearance light emitting diode lighting of claim 9, wherein the plurality of light emitting diodes for each of the light tiles includes one of an ultraviolet light emitting diode and a blue light emitting diode.

12. The low-clearance light emitting diode lighting of claim 11, further comprising a color conversion films on front sides of the light guide panels of the light tiles.

13. The low-clearance light emitting diode lighting of claim 11, further comprising color conversion films on the at least two side surfaces of the light guide panels of the light tiles.

14. The low-clearance light emitting diode lighting of claim 9, wherein the upper and lower metal frames support light tiles having different shapes.

15. A low-clearance light emitting diode lighting, comprising:
a plurality of light tiles, each including:
a light guide panel;
a plurality of light emitting diodes positioned on at least two side surfaces of the light guide panel;
a reflecting plate at a back surface of the light guide panel;
reflectors positioned on the light guide panel and having reflecting surfaces at two opposing sides of each of the plurality of light emitting diodes;
a lower metal frame having openings that each respectively encircle one light tile and the lower metal frame having a stepped section at the periphery of the metal frame, the stepped section having first, second and third contiguous portions in which the first portion receives a ceiling-grid of a drop-ceiling, the second portion protrudes from the first portion below the ceiling-grid, and the third portion contacts the light tiles; and
an upper metal frame sandwiching the plurality of light tiles between the lower metal frame and the upper metal frame.

16. The low-clearance light emitting diode lighting of claim 15, wherein the plurality of light emitting diodes includes green light emitting diodes, blue light emitting diodes and red light emitting diodes.

17. The low-clearance light emitting diode lighting of claim 15, wherein the plurality of light emitting diodes includes one of a blue light emitting diode and an ultraviolet light emitting diode.

18. The low-clearance light emitting diode lighting of claim 17, further comprising a color conversion film on a front side of the light guide panel.

19. The low-clearance light emitting diode lighting of claim 17, further comprising a color conversion films on the at least two side surfaces of the light guide panel adjacent to the plurality of light emitting diodes.

* * * * *